March 18, 1924.
W. E. GASKIN
CONTROL DEVICE FOR CUTTING AND WELDING TORCHES
Filed Dec. 26, 1922
1,487,230
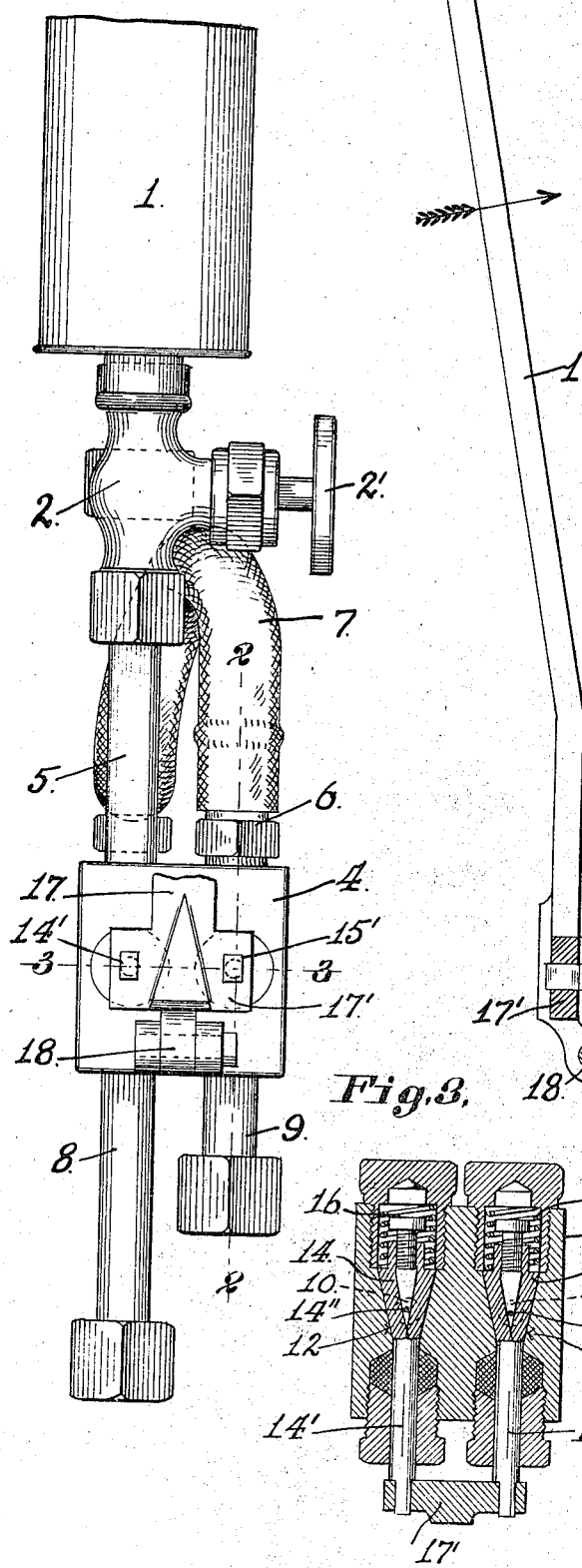
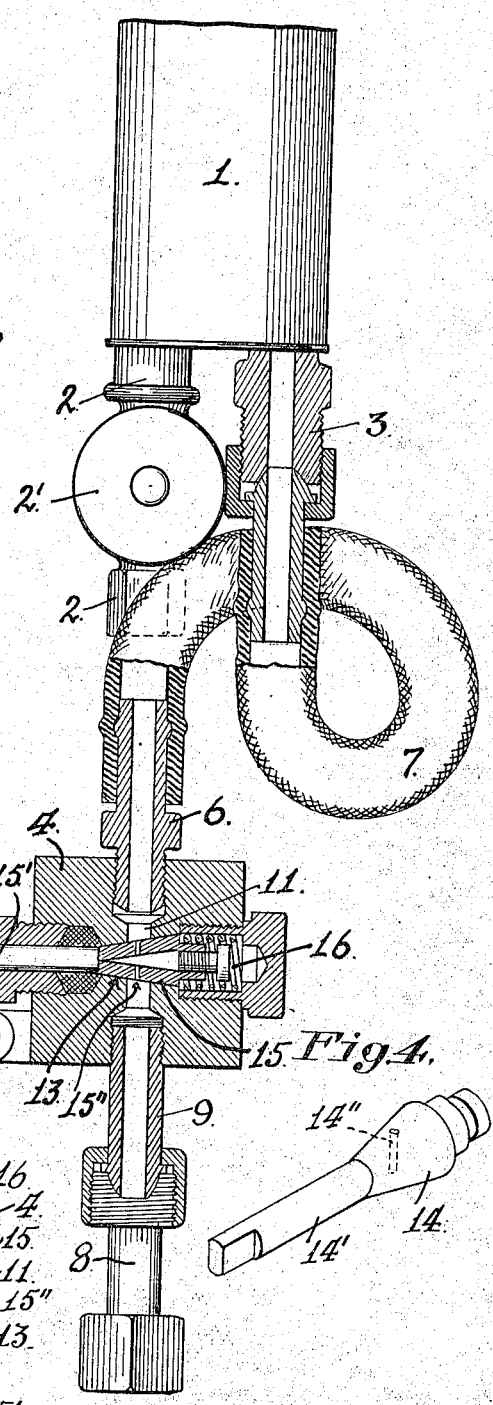
Inventor,
William E. Gaskin
By Booth & Booth
attorneys.

Patented Mar. 18, 1924.

1,487,230

UNITED STATES PATENT OFFICE.

WILLIAM E. GASKIN, OF OAKLAND, CALIFORNIA.

CONTROL DEVICE FOR CUTTING AND WELDING TORCHES.

Application filed December 26, 1922. Serial No. 609,060.

*To all whom it may concern:*

Be it known that I, WILLIAM E. GASKIN, a citizen of the United States, residing at Oakland, in the county of Alameda and State of California, have invented certain new and useful Improvements in Control Devices for Cutting and Welding Torches, of which the following is a specification.

My invention relates to the class of cutting and welding torches, and particularly to the control of the gases supplied thereto. In torches using oxygen and acetylene, there is a valve associated with the torch for controlling the admission of the oxygen and another valve for controlling the admission of the acetylene. These valves are usually separately operated and require intentional action both to open and close them. As a consequence, especially when using the torch for cutting, the operator is strongly inclined, and usually follows his inclination, to lay aside the torch in the intermissions of cutting, with the valves still open, rather than to deliberately trouble himself with closing them. There is, therefore, considerable waste in the gases.

The object of my invention is to save the gas by avoiding this waste, and this I accomplish by providing a supplementary valve control which will automatically cut off in greater part the supply of both gases upon laying the torch aside, but will still allow a small amount to pass for the pilot light.

The nature of my invention will be fully understood from the following description and from the accompanying drawings in which—

Fig. 1 is an elevation of my control device, the operating lever being broken away in part.

Fig. 2 is an elevation of the device partly in section on the line 2—2 of Fig. 1.

Fig. 3 is a sectional view through the control valves, on the line 3—3 of Fig. 1.

Fig. 4 is a perspective view of one of the control valves.

1 is the rear end of a torch, with the internal construction of which my invention is not concerned, and it therefore needs no elaboration.

2 is the usual supply fitting for the oxygen, 2' being the valve usually present to control said supply.

3 is the usual supply fitting for the acetylene, which supply is controlled by a customary valve not shown.

My supplementary control device comprises a valve seat block 4, to which is fitted a pipe section 5 coupled to the oxygen supply fitting 2 and a pipe section 6 coupled to the acetylene supply fitting 3 through a convenient length of hose 7. The valve seat block 4 has fitted to it at its opposite side a pipe section 8 leading to the source of oxygen and a pipe section 9 leading to the source of acetylene, neither gas source being necessary to show herein. In the valve seat block are two separate through ports 10 and 11 (Fig. 3) which connect the pipe sections 5 and 8, and the pipe sections 6 and 9 respectively. Traversing the ports are conical valve seats 12 and 13, in which are mounted longitudinally slidable, conical valves 14 and 15 respectively, each of which is held in a normally closed position by a spring 16.

17 is a lever pivoted to the block 4 at 18 and extending beside and in convenient proximity to the torch 1, as seen in Fig. 2. The lever 17 has a cross foot 17', one arm of which engages and bears against the shouldered outer end of the valve stem 14' of the valve 14, and the other arm engages and bears against the shouldered outer end of the valve stem 15' of the valve 15.

In the valves 14 and 15 which are taper-bored are small transverse ports 14" and 15" respectively, which when opened to a proper extent by the adjustment of the needle valves seated in the taper-bore of the valves 14 and 15, as seen in Figs. 2 and 3, provide for the passage of the required amount of gas to feed the pilot light. Thus the valve 14 controls the oxygen supply, while the valve 15 similarly controls the acetylene supply.

The operation of my control device is as follows:—

The customary control of the torch having been adjusted for the gas supply required for the particular work, need not thereafter be touched during the progress of the job, regardless of temporary rest intermissions. The springs 16 of my control device normally hold the valves 14 and 15 closed and only enough gas supply is furnished for the pilot light through the small ports 14" and 15" in said valves. Upon taking the torch in hand, the operator presses the lever 17 in towards the torch, and this movement of said lever, through its cross foot 17′, presses back the slidable conical valves 14 and 15, to open a passage around them for both gases to flow to the mixing chamber of the torch and while working with the torch, he continues to hold back the lever 17 and to keep the valves open. But when he lays down the torch for any reason, the springs 16 close the valves 14 and 15 automatically and only enough gas is supplied through the small ports 14″ and 15″ for the pilot light. Thus the torch is always ready to be picked up and used by again pressing in the lever 17.

I claim:—

1. A control device for cutting and welding torches comprising self-closing valves in the gas passages rearward of the mixing chamber and independent of the main valves of said torch, each of said self closing valves having restricted ports for the passage of a small volume of gas for the pilot light; and means for simultaneously opening said self closing valves at will.

2. A control device for cutting and welding torches comprising a block having through passages; fittings at each end of each passage communicating with the sources of gas supply and with the inlet fittings to the torch; conical taper-bored valves slidably mounted in said block and traversing its through passages, said valves having restricted ports for the passage of a small volume of gas for the pilot light; needle valves seated in the taper-bore of said valves for controlling said restricted ports; springs for holding said taper-bored valves in normally closed position; and a lever pivoted to said block and engaging said taper-bored valves to simultaneously open them.

In testimony whereof I have signed my name to this specification.

WILLIAM F. GASKIN.